(12) United States Patent
Taylor

(10) Patent No.: US 11,512,260 B2
(45) Date of Patent: Nov. 29, 2022

(54) PULSE DETONATION SHOCKWAVE GASIFIER

(71) Applicant: Donald Gene Taylor, Kamas, UT (US)

(72) Inventor: Donald Gene Taylor, Kamas, UT (US)

( * ) Notice: Subject to any disclaimer, the term of this patent is extended or adjusted under 35 U.S.C. 154(b) by 0 days.

(21) Appl. No.: 17/118,965

(22) Filed: Dec. 11, 2020

(65) Prior Publication Data
US 2021/0207047 A1 Jul. 8, 2021

Related U.S. Application Data

(63) Continuation-in-part of application No. 16/005,432, filed on Jun. 11, 2018.

(51) Int. Cl.
*C10J 3/78* (2006.01)
*C10J 3/48* (2006.01)
*C10J 3/46* (2006.01)

(52) U.S. Cl.
CPC ............... *C10J 3/78* (2013.01); *C10J 3/466* (2013.01); *C10J 3/485* (2013.01); *C10J 2300/094* (2013.01); *C10J 2300/0916* (2013.01); *C10J 2300/1261* (2013.01)

(58) Field of Classification Search
CPC .......................... C10J 2300/1261; F02K 7/075
See application file for complete search history.

(56) References Cited

U.S. PATENT DOCUMENTS

| | | | |
|---|---|---|---|
| 4,278,446 A | 7/1981 | Von Rosenberg, Jr. et al. | |
| 4,529,377 A * | 7/1985 | Zinn ................... | F27D 99/0033 431/1 |
| 4,544,394 A | 10/1985 | Hnat | |
| 4,929,172 A * | 5/1990 | Zinn ...................... | F23C 15/00 431/1 |
| 4,957,527 A | 9/1990 | Hnat | |
| 4,977,837 A | 12/1990 | Roos et al. | |
| 5,018,457 A | 5/1991 | Brady et al. | |
| 5,050,511 A | 9/1991 | Hallett et al. | |
| 5,059,404 A * | 10/1991 | Mansour ................ | C10K 1/004 48/77 |
| 5,114,122 A | 5/1992 | Haat | |
| 5,188,043 A | 2/1993 | Trepaud | |
| 5,205,728 A * | 4/1993 | Mansour ................ | F23D 1/005 431/114 |
| 5,269,235 A | 12/1993 | McGill et al. | |

(Continued)

OTHER PUBLICATIONS

Roos; "Clean Heat and Power Using Biomass Gasification for Industrial and Agricultural Projects"; WSU Extension Energy Program; (Feb. 2010); 64 pages; Biomass Gasification; WSUEEP08-033 Rev. 5, 2010.

*Primary Examiner* — Imran Akram
(74) *Attorney, Agent, or Firm* — Thorpe North and Western LLP

(57) ABSTRACT

Gasifiers, gasification systems, and methods for producing synthesis gas are disclosed. A gasifier can include a gasifier body. A feeder can be positioned to feed an organic material into the gasifier body. A pulse detonation burner can be located under or above the gasifier body and connected to the gasifier body to direct supersonic shockwaves upward into the gasifier body to heat the organic material and to form a jet spouted bed of the organic material or to operate as an entrained flow reactor. An outlet can be located at the gasifier body to allow removal of synthesis gas, residual ash, and other reaction products.

18 Claims, 6 Drawing Sheets

(56) References Cited

U.S. PATENT DOCUMENTS

| | | | |
|---|---|---|---|
| 5,536,488 A * | 7/1996 | Mansour | C10K 1/004 423/652 |
| 5,672,184 A | 9/1997 | Hunter, Jr. | |
| 6,062,018 A | 5/2000 | Bussing | |
| 6,548,197 B1 * | 4/2003 | Chandran | C10J 3/54 429/441 |
| 6,997,118 B2 | 2/2006 | Chandran et al. | |
| 8,088,832 B2 | 1/2012 | Melnichuk et al. | |
| 8,893,992 B2 | 11/2014 | Mitchell et al. | |
| 9,062,263 B2 | 6/2015 | Sevastyanov | |
| 9,365,422 B2 | 6/2016 | Chakravarti et al. | |
| 2004/0031450 A1 * | 2/2004 | Chandran | C10J 3/721 122/24 |
| 2004/0079087 A1 * | 4/2004 | Chandran | C10K 1/002 60/781 |
| 2004/0182000 A1 * | 9/2004 | Mansour | F23C 10/18 48/128 |
| 2005/0109010 A1 | 5/2005 | Dean et al. | |
| 2009/0056537 A1 * | 3/2009 | Neumann | C10J 3/56 95/91 |
| 2009/0084036 A1 * | 4/2009 | Neumann | F23C 10/12 432/15 |
| 2009/0094893 A1 * | 4/2009 | Neumann | C10J 3/463 48/197 R |
| 2009/0173005 A1 * | 7/2009 | Neumann | C10J 3/503 48/197 R |
| 2010/0040510 A1 | 2/2010 | Randhava et al. | |
| 2012/0111109 A1 * | 5/2012 | Chandran | B01J 8/0055 73/32 R |
| 2012/0279128 A1 | 11/2012 | Zhang et al. | |
| 2013/0144087 A1 | 6/2013 | Arora | |
| 2013/0167441 A1 * | 7/2013 | Sevastyanov | C10J 3/46 44/280 |
| 2013/0277464 A1 * | 10/2013 | Mitchell | C10J 3/506 241/38 |
| 2015/0184090 A1 | 7/2015 | Ni | |
| 2015/0275111 A1 * | 10/2015 | Chandran | C10J 3/723 422/223 |
| 2016/0032904 A1 | 2/2016 | Kaplan et al. | |
| 2016/0304424 A1 | 10/2016 | Wix et al. | |
| 2017/0301938 A1 * | 10/2017 | Chandran | C01B 3/50 |

\* cited by examiner

PULSE DETONATION SHOCKWAVE GASIFIER

RELATED APPLICATION

This application is a continuation-in-part of U.S. application Ser. No. 16/005,432, filed Jun. 11, 2018, entitled "Pulse Detonation Shockwave Gasifier" which is incorporated herein by reference.

FIELD OF THE INVENTION

The present technology relates generally to methods and apparatus for producing reducing gases, commonly known as synthesis gas or syngas, by gasifying carbonaceous material.

BACKGROUND

Gasification systems may be used to form fuel-gas, syngas, a mixture of gases including carbon monoxide and hydrogen. Syngas is often used as a fuel or as a feedstock for forming other compounds. Gasification typically involves heating a carbonaceous material, such as biomass, to convert hydrocarbons in the material into carbon monoxide and hydrogen gases. Besides syngas, other products from a gasification reactor may include methane, acetylene, ethylene, and other low-molecular weight gases, volatile organic vapors, aerosol-tars, carbon-char, and residual carbonaceous mineral ashes. The energy requirements of gasification reactors can be substantial, while the aerosol-tars and carbon-char can pose problems for the energy conversion equipment, while lowering net conversion efficiency. Reforming of the tars and carbon-char may be performed, but this can add significantly to costs and energy requirements associated with the process.

SUMMARY

In some examples of the present technology, a gasifier can include a gasifier body, a feeder, a pulse detonation burner, and an outlet. The feeder can be positioned to feed an organic material into the gasifier body. The pulse detonation burner can be located under the gasifier body and connected to the gasifier body such that the pulse detonator directs supersonic shockwaves upward into the gasifier body. The inverse position is also possible, so that the pulse detonation burner can also be located on top of the gasifier body and connected to the gasifier body such that the pulse detonator directs supersonic shockwaves downward into the gasifier body acting as an entrained flow reactor. The supersonic shockwaves can both heat the organic material and form a jet spouted bed of the organic material in the gasifier body. The outlet can be located at an upper portion of the gasifier.

In further examples, a gasification system can include a gasifier as described above and a reformer connected to the outlet of the gasifier. The reformer can receive synthesis gas and residual material from the gasifier. The reformer can include a reformer body and a second pulse detonation burner located above the reformer body. The second pulse detonation burner can be connected to the reformer body to direct supersonic shockwaves downward into the reformer body to heat the synthesis gas and residual material. The inverse position is also possible, so that the reformer can include a reformer body and a second pulse detonation burner located below the reformer body. The second pulse detonation burner can be connected to the reformer body to direct supersonic shockwaves upward into the reformer body to heat the synthesis gas and residual material.

In other examples of the present technology, a method of producing synthesis gas can include introducing an organic material into a gasifier. The gasifier can include a gasifier body and a pulse detonation burner located under the gasifier body. Supersonic shockwaves can be fired from the pulse detonation burner upward into the gasifier body to heat the organic material and form a jet spouted bed of the organic material. Synthesis gas and residual ash can be removed from the gasifier through an outlet located at an upper portion of the gasifier body.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1A:
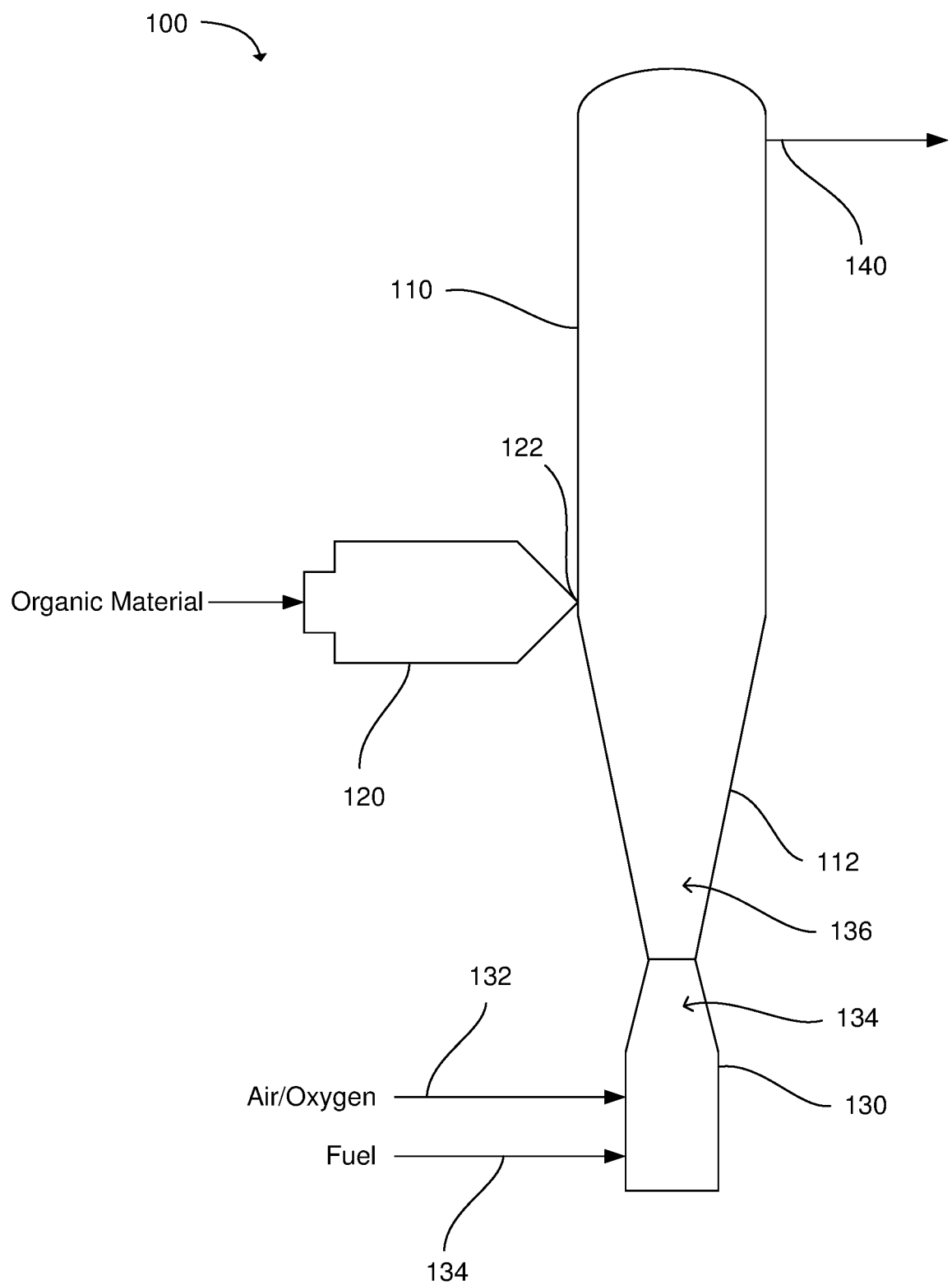
FIG. 1A is a schematic view of an example gasifier in accordance with an example of the present technology.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

It is noted that, as used in this specification and in the appended claims, the singular forms "a," "an," and "the" include plural referents unless the context clearly dictates otherwise. Thus, for example, reference to "an outlet" includes one or more of such features, reference to "a material" includes reference to one or more of such elements, and reference to "removing" includes reference to one or more of such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 5%, and most often less than 1%, and in some cases less than 0.01%.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. "Substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following figures should not be considered limiting.

Pulse Detonation Shockwave Gasifiers

The present technology involves gasifiers that utilize supersonic shockwaves created by pulse detonation burners to gasify organic material. These gasifiers can be incorporated into gasification systems that may also include a pulse detonation burner-powered reformer. In some examples, the technology described herein can be used as a modification of the systems and processes disclosed in U.S. Pat. No. 5,584,255, which is incorporated herein by reference. In certain examples, the gasifier can volatize organic feed materials by employing a mixture of fuel and oxygen, which burns to form high-temperature carbon dioxide and water vapor that are injected into the gasifier. The extreme heat and the presence or absence of free oxygen can cause the organic feed materials to volatilize and dissociate into a mixture of syngas, volatile organic compounds, carbon-char, and residual mineral ash. The gasifier can be used as the first stage in a gasification process. Inputs into the gasifier can include both heat and mechanical energy from a pulse-detonation burner. A second stage of the gasification process can include a reformer integrated in the process in such a way that the reformer lowers the energy requirements for syngas production. The reformer can function to convert the volatile organic compounds, including tar vapors and carbon-char from the gasification reactor, into fuel-gas and synthesis gases, employing heat input as hot gases that include oxidizing and reducing gases, and mechanical energy supplied by shockwaves discharged from a pulse-detonation burner.

In further examples, the gasifier can employ a robust jet-spouted bed for the primary gasification stage. The exhaust itself ejected from the pulse detonation burner can be used to form the jet of the jet-spouted bed. By incorporating pulse-detonation technology, several benefits can be achieved because the jet-spouted bed can utilize shockwave momentum as a source of power input. A jet spouted bed is formed by a bottom inlet for gases that discharges into a conical expanded bed, wherein a low-density bed composed of organic or inorganic materials is circulated, bed materials are comminuted, and elutriated by the inlet gas and product gases. In some examples, pulse detonation burners can discharge shockwaves with supersonic velocities up to about 3,000 meters per second. The supersonic compression waves can compress molecules close together, increasing the rate of thermal chemical reactivity at the molecular level. Additionally, the compression waves can enhance comminution of the organic feed material at the macro-level. Rapid mixing and comminution of the feed can also enable the use of relatively coarse feed materials.

The gasifiers, systems and processes described herein can use pressure-gain-combustion methods to increase process-intensity. A problem with traditional gasification methods is that increasing process intensity can also increase parasitic power consumption. For example, employing high-temperature plasma burners to enable tar cracking and carbon-char reforming can increase process intensity, but can also increase the cost of parasitic power consumption. In contrast, the use of pulse-detonation burners can increase process intensity and concurrently reduce parasitic power consumption. Moreover, the pulse combustion hardware can be fabricated and operated at low cost compared to many other intensification methods. In some examples, a pulse detonation burner can be constructed using a tubular combustion chamber, with or without cooling means, with fuel and air or oxygen inputs, combined with a cyclic ignition system.

In certain examples of the present technology, a pulse-detonation burner can produce heat in the form of hot-exhaust gases and mechanical power to drive materials circulation within a jet-spouted bed gasifier. The gasifier can serve as the devolatilization stage in a gasification process. In a second stage of the process, a reformer can also be powered by the heat and mechanical power produced by a second pulse-detonation burner. The reformer can also operate similarly to a venturi ejector. The gases produced by the second pulse detonation burner can act as a motive fluid to draw the effluent from the gasifier into the reformer. Tars and carbon-char in the effluent of the gasifier can be converted into more syngas using the reformer. This can provide an energy efficient process to mitigate environmental risks posed by the byproducts of the gasifier.

In both the gasifier and the reformer, the supersonic compression waves generated by the pulse detonation burners can enhance the reaction rate of molecules by pushing the molecules closer together each time a compression wave passes through. Although the gasifier and reformer may be operated at or near atmospheric pressure, the compression waves from the pulse detonation burners can mimic operating the gasifier and reformer at an elevated pressure. The compression waves can also enhance mixing of the materials in the gasifier and reformer, as well as comminute solid organic and mineral materials to smaller particle sizes. All these effects can increase reaction rates in the gasifier and reformer.

In further examples, the gasification process can be operated at a temperature below the ash-fusion temperature. For example, the gasifier and reformer can be operated at a temperature of 1150° C. or less. Some high-temperature gasifiers operate above the ash-fusion temperature, such as at temperatures of 1300° C. to 1450° C. At these temperatures molten mineral ashes flow at low viscosity, and this can incur a high oxygen cost and refractory problems. To avoid these problems, the gasifiers and/or reformers described herein can operate, in some examples, at a temperature from 920° C. to 1150° C. In further examples, the gasifier and reformer can operate at a temperature from 1050° C. to 1250° C.

With this description in mind, FIG. 1A shows a schematic of a gasifier 100 in accordance with an example of the present technology. The gasifier includes a gasifier body 110, a feeder 120, and a pulse detonation burner 130. In this example, the gasifier body includes a conical portion 112 expanding upward from the bottom of the gasifier body. The pulse detonation burner can be supplied with air, oxygen, or oxygen enriched air through air line 132 and fuel through fuel line 134. The feeder can be positioned to feed an organic material that may include mineral matter into the gasifier body. The pulse detonation burner is located under the gasifier body and connected to the gasifier body to direct supersonic shockwaves upward into the gasifier body. The shockwaves and hot gas produced by the pulse detonation burner can heat the organic material and form a jet spouted bed of the organic material in the gasifier body. Syngas can be produced in the gasifier. The syngas and any residual materials, such as organic vapors, tar, carbon-char, and mineral ashes, can flow out of the gasifier through an outlet 140.

In this example, the feeder 120 feeds organic material into an inlet 122 located on a side of the gasifier body 110 part-way up the height of the gasifier body. In some examples, the feeder can be positioned to feed the organic material into an entrainment zone within the gasifier body, enabling the gasifier to be fired in the downward direction, thereby operating the gasifier body as an entrained flow reactor. The feeder can move organic material into the gasifier body in a variety of ways. In some examples, the feeder can include an extrusion feeder, auger, hydraulic ram, conveyor belt, gravity-fed hopper, or combinations thereof.

The organic material fed into the gasifier can include industrial organic waste, agricultural waste, domestic organic waste, municipal solid waste, coal, biomass, post-sorted refuse derived biomass, or combinations thereof that may include a significant fraction of mineral matter. In certain examples, the organic material can be a type of wet or dry organic waste, including sewage and sewage-sludge, human and animal wastes, and various types of wet and dry manure.

As a general guideline, the organic feed material can be a dry fibrous or particulate material, with less than 1% moisture, although in some cases can contain up to 99% water. In further examples, the organic material can have an average particle size from 1 mm to 10 cm. In most cases, the organic material can have an average particle size from 5 mm to 3 cm. In certain examples, the organic material can have a relatively larger coarse particle size than would otherwise be used in a spouted bed gasifier because the supersonic shockwaves produced by the pulse detonation burner can crush the particles to smaller sizes within the gasifier. In further examples, the organic material can initially have an average coarse particle size of 2 cm to 10 cm. As used herein, "particle size" refers to the diameter of a spherical particle or the longest dimension of a non-spherical particle. Additionally, "average particle size" refers to the number average particle size of the particles in the organic material fed into the gasifier. The feed materials are typically pre-shredded or otherwise size-reduced; for example, using a rotary-shear machine that is commonly used to size-reduce paper, plastic, fibers, wood, municipal solid wastes, and other organic materials that include inherent mineral matter up to about 45%. The feed materials that result from size-reduction typically have non-uniform dimensions and include fine particulate matter, fibrous materials, as well as sheets and flakes.

The pulse detonation burner 130 used to supply energy to the gasifier can include a detonation chamber or zone 134 connected to the gasifier body such that when fuel is detonated in the chamber, reaction products of the detonation are directed into the gasifier body. A discharge zone 136 can also be oriented adjacent the detonation zone 134 in order to allow combustion products to be exhausted from the burner body near the maximum theoretical velocity by employing internal shapes that form a nozzle, which can be of the converging/diverging type, with a converging nozzle angle between 7-degrees and 67-degrees and a diverging angle between 0-degrees and 90-degrees. The discharge zone, i.e. the expansion zone, can be constructed of metal, ceramic, or formed form refractory cement. The discharge zone, i.e. the expansion zone, typically includes means to inject gases, liquids, and solids, singularly or in combinations, including ternary mixtures of carbon-char particles and liquid-tars that are entrained by low-pressure steam, injected into the discharge zone through openings that can be annular, recessed to minimize turbulence, and directed in the direction for the expanding shockwaves. The pulse detonation burner can be located beneath the gasifier and oriented upward so that the reaction products form an upward moving gas jet to fluidize organic material in the gasifier body.

Figure 1B:
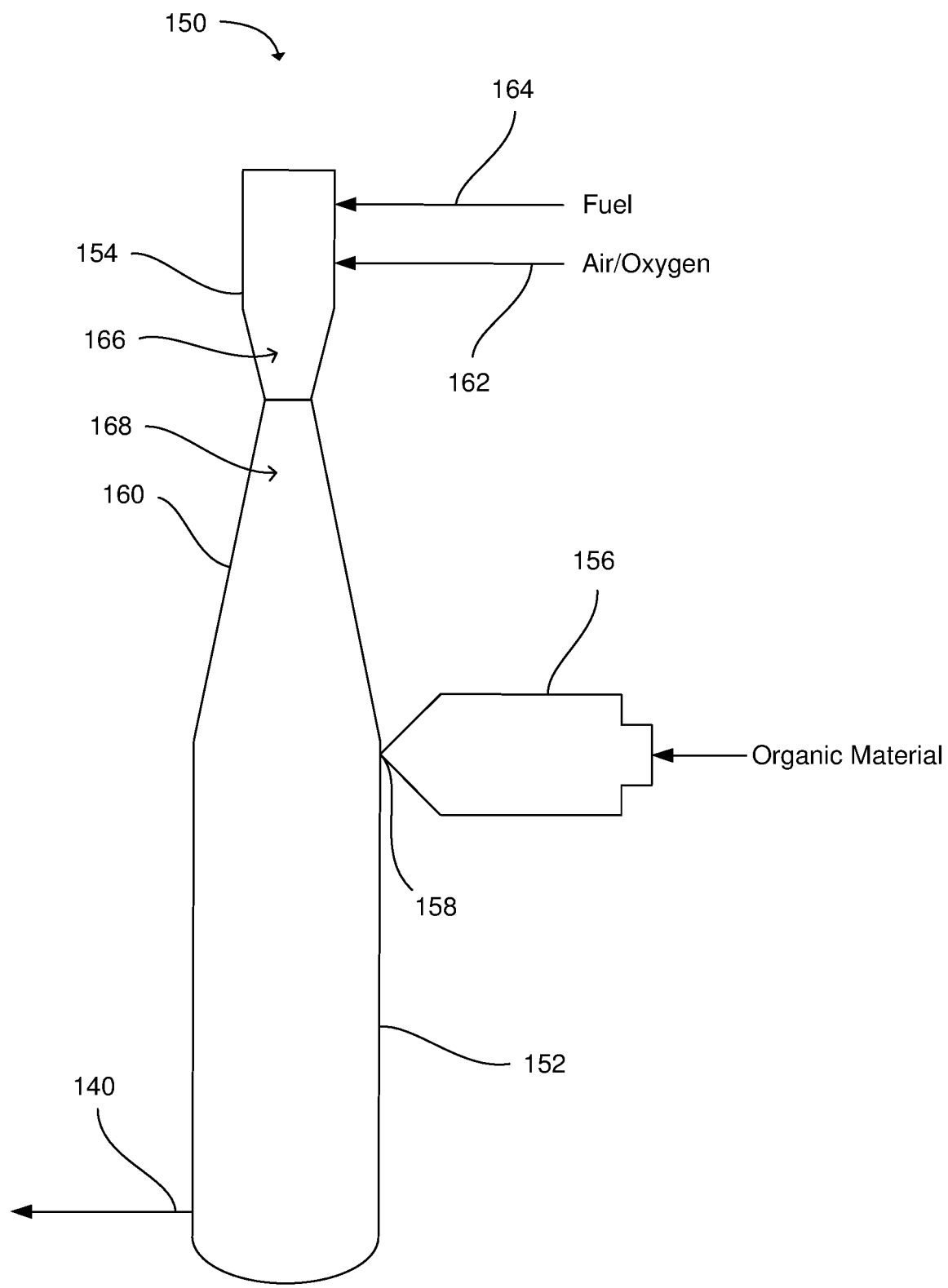
FIG. 1B is a schematic view of an example gasifier in accordance with another example of the present technology.

Alternatively, as illustrated in FIG. 1B, the inverse position can include a gasifier 150 having a gasifier body 152 and having a pulse detonation burner 154 located on top of gasifier body 152. In this case, the pulse detonation can be directed downward into the gasification body so that the gasifier acts as an entrained flow reactor. As with the inverse configuration, corresponding components can be used. A feeder 156 can be positioned to introduce organic material into the gasifier body via an inlet 158. The gasifier body 152 can include a conical portion 160. The pulse detonation burner 154 can be supplied with air, oxygen, or oxygen enriched air through air line 162 and fuel through fuel line 164. As with the configuration of FIG. 1A, the gasifier 150 of FIG. 1B can include a detonation zone 166 and a discharge zone 168.

In certain examples, the detonation chamber can be a hollow tube. The tube can generally have a diameter from 1 cm to 50 cm, for example, and can be air-cooled or water-cooled. In further examples, the tube can have a length from 12 cm to 600 cm, and often from 80 cm to 160 cm. In various examples, the detonation chamber can be formed of any material that can withstand the high pressures and temperatures produced by the detonations. Some non-limiting examples of materials used in the detonation chamber can include steel, stainless steel, copper, nickel, tungsten, tantalum, molybdenum, niobium, aluminum, and alloys thereof. In other examples, the detonation chamber can include a ceramic material. Copper construction is particularly useful because of its superior heat-transfer capability, which enables air cooling or water cooling of the pulse detonation chamber in order to maintain discrete detonation events, as compared to the formation of continuous or semi-continuous deflagrations.

The pulse detonation burner can also include a fuel inlet connected to a fuel source. In some examples, the fuel detonated in the pulse detonation burner can include a hydrocarbon such as natural gas, ethane, propane, butane, gasoline, and so on. In other examples, the fuel can include syngas. In some cases, a portion of fuel-gas or syngas produced by the gasification process can be used to fuel the pulse detonation burner. For example, product gases containing hydrogen and unsaturated hydrocarbons, exemplified by light olefins, particularly including acetylene, ethylene, and propylene, are particularly attractive because of the ability to form explosive mixtures with air or oxygen enriched air. In still further examples, the fuel can include residual carbon char that is left as a byproduct of the gasification process that is thereby recycled into the gasification process, and may include mineral matter that serves as a catalyst to either the detonation process or the gasification process. Additional suitable fuels can include micronized-carbon sourced from biochar, torrefied biomass, and coal fines. Micronized solids can be conveyed into the detonation zone of the detonation burner by one or more carrier fluids, such as fuel-gases or liquid-fuels that serve as the carrier fluid. Non-limiting examples of such carrier fluids include hydrogen, methane, syngas, producer-gas, steam, kerosene, methanol, and combinations of these or similar fluids.

An oxygen inlet can supply oxygen to the detonation chamber to detonate with the fuel. In some examples, the oxygen inlet can simply supply plain air to the detonation chamber. In other examples, the oxygen inlet can supply pure oxygen or oxygen-enriched air. In some cases, oxygen-enriched air can include from about 30 mol % to 90 mol % oxygen, and in some cases up to 99.9 mol %. Gaseous air enriched from about 33 mol % oxygen to about 70 mol % oxygen is particularly advantageous because the production cost is modest compared to production cost of air enriched to greater than 90 mol % oxygen and the pulse detonation process can tolerate the presence of fuel diluents, including nitrogen, carbon dioxide, and water vapor.

In certain examples, the ratio of fuel to air employed by the pulse detonation burner can be either fuel-rich or fuel-lean, depending on the need for reducing gases or oxidizing gases within the gasification and reforming processes. The power output generated by the pulse detonation burner is not strictly tied to the combustion stoichiometry, and therefore both fuel-rich and fuel-lean stoichiometry can be successfully employed. The range for the ration of fuel to air is typically from 1:1 to 1:50 by weight. In further examples, the ratio can be from 1:5 to 1:25 or from 1:10 to 1:20. The optimal fuel to air ratio may vary depending on the type of fuel used and the amount of oxygen in the air, for example. Availability of free oxygen is desirable when autothermal gasification and partial oxidation are process objectives within the gasifier and the reformer. In some examples, the exhaust gas from the pulse detonation burner can contain more than 20% free oxygen and at least 12% carbon oxides and at least 3% water vapor. In further examples, the exhaust gas can contain from 5% to 10% free oxygen, 12% to 30% carbon oxides, and from 3% to 10% water vapor. In some examples, the detonation exhaust gases will contain up to 40% hydrogen and less than 2% free oxygen, in the case when reducing gases are needed with the gasification or reforming zones. In an example, the pulse detonation chamber is operated with fuel and air input at about the stoichiometric ratio, with neither excess fuel or excess air, and then diluent air is mixed with the detonation exhaust gases to generate a mixed stream of hot oxidizing gases that are used for autothermal gasification. In one non-limiting example, the oxygen flows continuously into the detonation burner mixing chamber, the detonations occur during fuel-rich conditions, operating with a target of Phi=1.33 for the oxygen-fuel mixture achieved during the detonation phase; oxygen continues to flow during a short purge phase following each detonation, thereby causing the detonation burner-exhaust to contain excess oxygen for the instant between fuel-injections, thus providing an excess of $O_2$, along with $H_2O$ and $CO_2$, in the burner exhaust, all of which exist as superheated exhaust-products that participate in partial-oxidation reactions associated with shockwave enhanced gasification of organic feeds.

In still another optional aspect, $CO_2$ can be recycled into the detonation zone of the detonation burner, or injected into the discharge zone. The $CO_2$ can be obtained from the gasifier outlet, reformer, or other units as described herein, or obtained from external sources of $CO_2$ that are intended for recycle into the detonation burner discharge zone, also known as the expansion zone, where thermochemical reactions are intensified to the extent that $CO_2$ serves as an oxidant that reacts with carbon, enabling the partial-oxidation of carbon, thereby forming large quantities of gaseous carbon monoxide, CO, a valuable constituent of synthesis gas used to produce synthetic jet fuel, for example. In one example, carbon dioxide, gases bearing $CO_2$, can serve as carrier gases for entrained particulate solids, including carbon-char, or any transition-metal or mineral catalyst selected from a list of active materials that include calcium oxide, calcium carbonate, and potassium carbonate. Liquids, including aqueous emulsions with tar-liquids, can likewise be injected along with $CO_2$ into the detonation zone of the detonation burner, or injected into the discharge zone, also known as the expansion zone.

As another optional example, the pulse detonation burner can include supplemental reactants in addition to the fuel and air/oxygen. For example, low-pressure steam can be injected into the pulse detonation burner. Such steam can also be injected downstream from the pulse detonation burner or in a discharge section of a tube (i.e. body) of the pulse-detonation burner, where thermochemical reactions are intensified to the extent that $H_2O$ serves as an oxidant that reacts with carbon, enabling the partial-oxidation of carbon, thereby forming large quantities of gaseous hydrogen, $H_2$, a valuable constituent of synthesis gas used for production of high-purity hydrogen gas, for example. Low pressure steam can generally be steam below about 50 psig, while in the context of a high-pressure Rankine-cycle steam plant, low-pressure can be up to 300 psig. In one example, low-pressure steam can serve as carrier gases for entrained particulate solids, including carbon-char, bio-char, torrefied carbon, or any transition-metal or mineral catalyst selected from a list of active materials that include calcium oxide, calcium carbonate, and the various form of potassium including potassium carbonate. Liquids, including aqueous emulsions with organic tars, can likewise be injected using low-pressure steam as the driving force to entrained liquids or solids injected into the detonation zone of the detonation burner, or injected into the discharge zone, also known as the expansion zone.

In some examples, the detonation of fuel with air, oxygen, or oxygen-enriched air can create shockwaves that travel at speeds of 100 meters per second to 3,000 meters per second, and in some cases greater than 150 meters per second. In further examples, the shockwaves can travel at speeds from 500 meters per second to 2,000 meters per second. The pulse detonation burner can thus be different from pulse deflagration burners, which discharge at lower speeds of around 10 to 100 meters per second.

The pulse detonation burner can also include a cyclic ignition system that can ignite the fuel inside the detonation chamber at pulsed intervals. In some examples, the detonations can have a frequency of at least 2 Hz. In further examples, the detonations can have a frequency from 2 Hz to 100 Hz. In certain examples, the frequency of the detonations can be selected and/or actively controlled to maintain a particular operating temperature within the gasifier. For example, the gasifier operating temperature may be from 920° C. to 1150° C. or from 1050° C. to 1550° C. In some examples, the temperature of the hot gas produced by the pulse detonation burner can be from 750° C. to 1250° C. Furthermore, the pulse detonation burner can produce hot gas at a temperature from 750° C. to 1550° C., and in some cases up to 3000° C. or from about 2000° C. to 3000° C. The average exhaust gas temperature is typically in the 750° C. to 1550° C. range. The near-instantaneous temperature achieved at or near the peak pressure achieve during the detonation cycle is significantly higher than the average exhaust temperature, and the peak temperature is more difficult to measure. The higher instantaneous temperature (e.g. 2000° C. to 3000° C.) of the detonation burner applies the secondary detonation burner used to accomplish reforming. The gasifier body itself can be designed to operate as a jet spouted bed reactor. In some examples, the gasifier body can include a conical portion tapering toward the pulse detonation burner at the bottom of the gasifier body. The conical portion can allow the hot gas stream from the pulse detonation burner to expand and form a jet spouted bed. The jet spouted bed is formed within a conical expanded bed section, which enables vigorous recirculation of bed materials causing comminution of the organic and inorganic solids retained within the low-density expanded bed that defines the jet spouting action known to those skilled in the art of fluidization. The gasifier body may also include a cylindrical portion above the conical portion. In some cases, heavy particles of organic material can move upward in the jet of hot gas from the pulse detonation burner and then disengage from the moving gas in the cylindrical portion of the gasifier body, at which point the heavy particles may fall back down and become entrained again in the hot gas stream. The height of the gasifier body can be sufficient to allow such heavy particles of organic material to become disengaged from upward flow so that the heavy particles do not flow out the outlet at the top of the gasifier body. In certain examples, the gasifier body can be from 2 meters to 30 meters tall. In further examples, the gasifier body can have a diameter from 10 cm to 7 m in the cylindrical portion.

Figure 2:
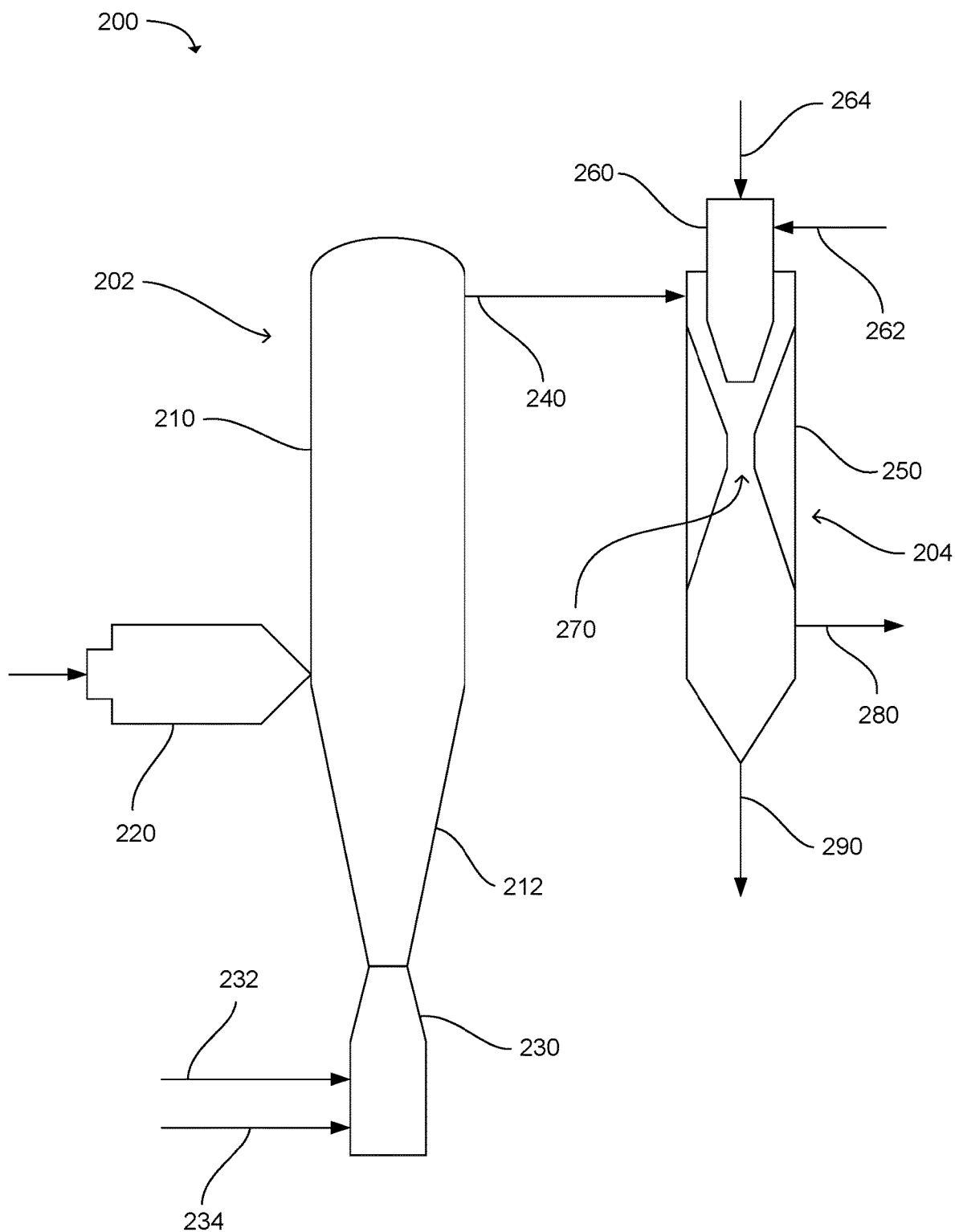
FIG. 2 is a schematic view of an example gasification system in accordance with an example of the present technology.

The present technology also extends to gasification systems that can include a gasifier as described above, and can include one or more additional process units. In some examples, a gasification system can include a gasifier and a reformer. FIG. 2 shows one example of such a gasification system 200. The system includes a gasifier 202 and a reformer 204. Similar to the gasifier shown in FIG. 1A, the gasifier includes a gasifier body 210, a feeder 220, and a pulse detonation burner 230. A conical portion 212 of the gasifier body expands upward from the bottom of the gasifier body. The pulse detonation burner can be supplied with air or oxygen enriched air through air line 232 and fuel through fuel line 234. The feeder can be positioned to feed an organic material into the gasifier body. Syngas and residual materials, such as organic vapors, tar, carbon-char, and mineral ashes, can flow out of the gasifier through an outlet 240.

The reformer 204 can receive the syngas and residual materials from the outlet 240 of the gasifier 202. In some examples, the reformer can convert at least some of the residual materials into additional syngas. In this example, the reformer includes a reformer body 250 and a second pulse detonation burner 260 located above the reformer body. The second pulse detonation burner can be connected to the reformer body to direct supersonic shockwaves downward into the reformer body to heat the synthesis gas and residual material. The second pulse detonation burner can also include a second air line 262 and a second fuel line 264 to provide air or oxygen enriched air and fuel to the second pulse detonation burner. The reformer can operate similarly to a venturi ejector. The reformer body can include a venturi constriction 270 to decrease pressure inside the reformer and draw the effluent from the gasifier into the reformer. Specifically, the pressure in the throat of the venturi constriction is reduced due to the increase in velocity of the fluid flowing through the constriction. The reduced pressure causes a suction force to draw effluent product gases from the outlet of the gasifier into the reformer, and creates a low pressure in the feed input zone. The low pressure zone in the feeding region can range from 3 inches-water-column-vacuum up to about 27 inches water-column-vacuum, that is, from about 0.1 psig below ambient pressure up to about 1-psig below ambient pressure.

In terminology used with venturi ejectors, the hot exhaust gases injected by the second pulse detonation burner are the "motive fluid" or "driving fluid" and the effluent from the gasifier is the "suction fluid." The heat and mechanical energy provided by the second pulse detonation burner can convert unreacted residuals in the gasifier effluent into additional syngas. The product gases from the reformer, including syngas and remaining residual materials, can flow out of the reformer through reformer outlet 280. In the example shown in FIG. 2, the reformer also has an ash outlet 290 where ash can be removed from the reformer.

In various examples, gasification systems can include other process units in addition to the gasifier and reformer shown in FIG. 2. As an example, in some cases the crude syngas flowing out of the outlet of the reformer can undergo additional processing such as syngas cleaning and water-gas shift reaction. Furthermore, multiple stages may be used for any of the process units, such as multiple gasification stages or multiple reforming stages. In particular, hot cyclone separators are typically installed in sequence following gasification and reforming to remove a mixture of carbon-char and mineral ashes. Hot cyclone separators can typically be installed down-stream from the gasifier or down stream from the reformer, and multiple hot cyclones can be operated in series or in parallel. Hot cyclone separators are usually an integral part of the gasification and reforming process and their operation is enhanced by the means of high velocity gas flow generated by the pulse detonation burners.

During startup of the gasification system, the pulse detonation burner connected to the gasifier may be used to supply heat to heat up the gasifier to operating temperature. When the gasifier reaches the operating temperature, the pulse detonation burner may continue to supply heat to maintain the operating temperature and oxygen to accomplish the autothermal gasification process. Similarly, the second pulse detonation burner connected to the reformer can be used during startup to supply heat to heat up the reformer and to supply oxygen for use in partial-oxidation in the reforming process. When the reformer reaches the operating temperature, the second pulse detonation burner can continue to supply heat to maintain the operating temperature. In some examples, the gasifier and the reformer can each have an operating temperature from 720° C. to 1150° C. or from 850° C. to 1250° C. The reforming stage is typically operated at a higher temperature compared the gasifier temperature, so that the temperature profile is increasing from the gasification stage to the reforming stage. The gasifier and reformer can each be started and stopped safely under controlled conditions by starting and stopping the pulse detonation burners.

The high temperature and presence or absence of free oxygen in the gasifier can cause organic feed materials in the gasifier to volatilize and dissociate into a mixture of syngas, volatile organic compounds, tar-vapors, carbon-char, and residual mineral ashes. This mixture can be directed to flow into the reformer. As explained above, the reformer can operate similarly to a venturi ejector to draw the effluent from the gasifier into the reformer and help to drive the flow of the products through the remainder of the process. The second pulse detonation burner can inject hot exhaust gases composed of either oxidizing or reducing gases into the reformer to drive the venturi flow through the reformer. The hot exhaust gases can also provide sufficient heat to convert residual materials in the gasifier effluent to additional syngas. The second pulse detonation burner can produce hot exhaust gases at a temperature from 750° C. to 1550° C., and in some cases up to 3000° C. Cyclic detonations of ternary methane-oxygen-steam mixtures are proved to generate highly superheated steam with temperature exceeding 2000° C. when expanded to the atmospheric pressure. The detonation products of stoichiometric ternary mixtures under consideration can contain up to 80% highly superheated and up to 17% $CO_2$ with various amounts of CO, $O_2$, and $H_2$. As a result of deep thermal processing (gasification) of organic wastes by such exhaust products, a gaseous mixture of CO and $H_2$ is obtained, which can be used to produce synthetic fuels, including renewable methane, $CH_4$, also known as renewable natural gas (RNG). The kinetics for the gasification reactions improve significantly as the temperature of reactants is increased. The hot exhaust products, including $H_2O$, $CO_2$, CO, and $H_2$, serve as chemical reactants in the organic gasification process. The maximum temperature that the reactants can reach as a result of cyclic detonation is very high, and the high-temperature conditions persist for about 2-milliseconds, which is long enough to increase productivity. The frequency of detonations in the second pulse detonation burner can be at least 2 Hz, for example from 2 Hz to 100 Hz. The exhaust gases can contain at least 10% oxygen, and 12% carbon oxides and at least 3% water vapor. For example, the exhaust gases can contain from 5% to 40% oxygen, 12% to 30% carbon oxides and from 3% to 10% water vapor. Under reducing conditions, for example, the exhaust gases can contain from 10% to 40% hydrogen. The second pulse detonation burner can be operated with any of the other parameters described above with respect to the first pulse detonation burner, such as fuel type, amount of oxygen in the air supplied to the pulse detonation burner, fuel to air ratio, and so on. In some examples, the pulse detonation burner powering the gasifier and the second pulse detonation burner powering the reformer can be operated with substantially the same operating parameters. In other examples, the pulse detonation burners can be operated with different operating parameters; both can be used to generate hot oxidizing gases, or both supplying hot reducing gases, or one can supply hot oxidizing gases the other suppling hot reducing gases. In one example embodiment, both burners supply hot oxidizing gases that contain greater than 10% free oxygen required to accomplish autothermal gasification within the gasifier and used for partial oxidation within the reforming section.

Figure 3:
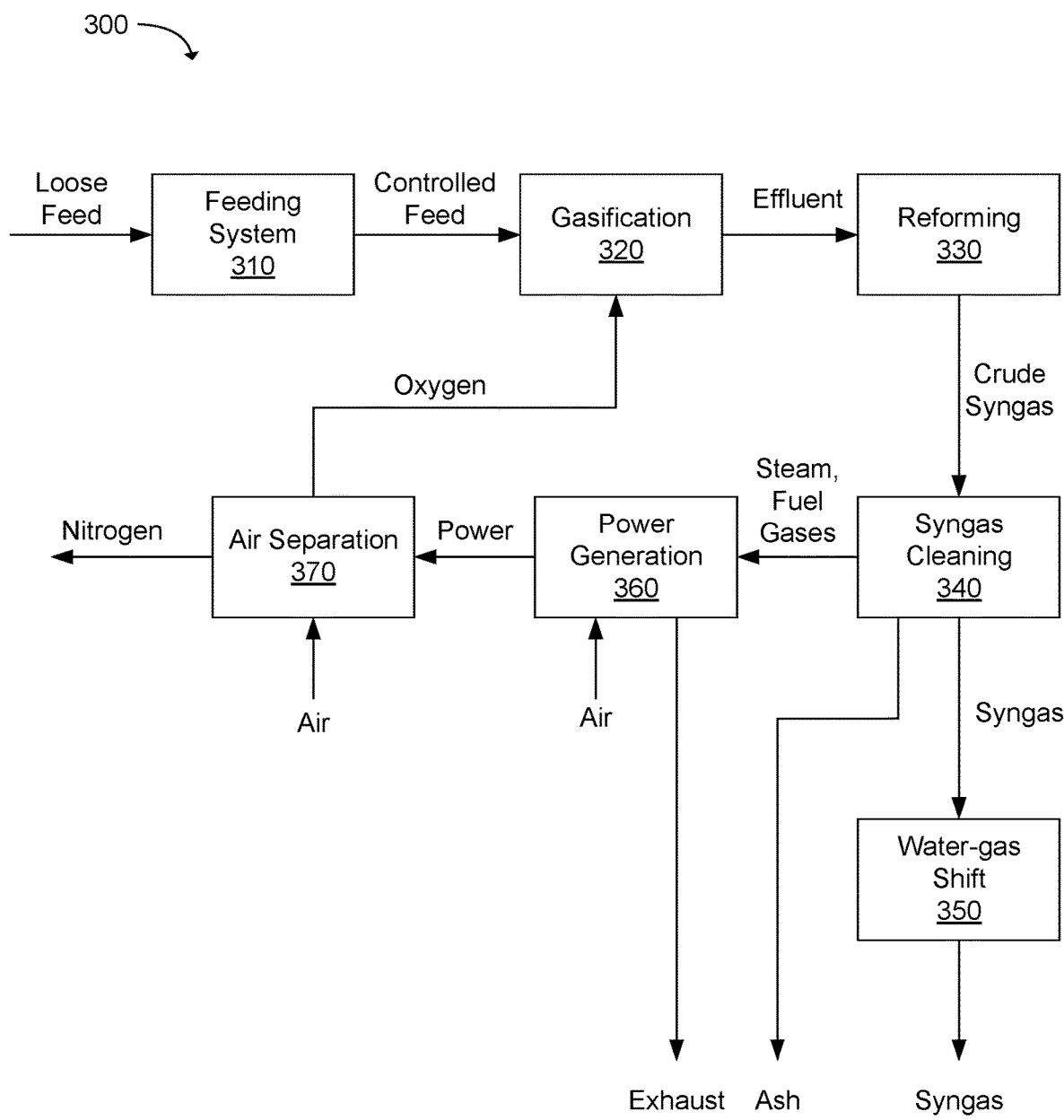
FIG. 3 is a block flow diagram of another example gasification system in accordance with an example of the present technology.

FIG. 3 is a block flow diagram of another example gasification system 300. In this system, the process of forming syngas begins with loose feed material, which is fed using a feeding system 310 into a gasification stage 320. In some examples, the feeding system can include equipment to comminute the feed material and/or transport the feed material at a controlled rate into the gasifier. The gasification stage can include one or more gasifiers as described above. Effluent from the gasification stage can flow into a reforming stage 330. The reforming stage can include one or more venturi-type reformers as described above. The reforming stage can produce crude fuel-gas or crude syngas, which then flows into a gas cleaning stage. The gas cleaning stage can separate fine particulate solids from the fuel gases or from the synthesis gases, and steam is typically removed by cooling the product gases during this stage and is recovered as water condensate. The steam and fuel gases can be utilized to generate power in power generation stage 360. Power generated by the power generation stage can be used for air separation 370, in which oxygen enriched air can be produced to supply oxygen to the gasification stage. The cleaned syngas from the syngas cleaning stage can then flow to a water-gas shift reaction stage 350. This stage can produce a purified syngas stream for use as a high-value source of low-molecular weight gases, including hydrogen and carbon oxides. The overall inputs into the gasification system include organic feed material and air, and the overall outputs include purified syngas, ash, exhaust, and nitrogen. In some examples, the syngas cleaning stage can produce usable fuel such as unreacted hydrocarbons or carbon-char. These can be used to generate power for air separation. Additionally, these fuels can be used by the pulse detonation burners to power the gasifier and/or reformer.

Figure 4:
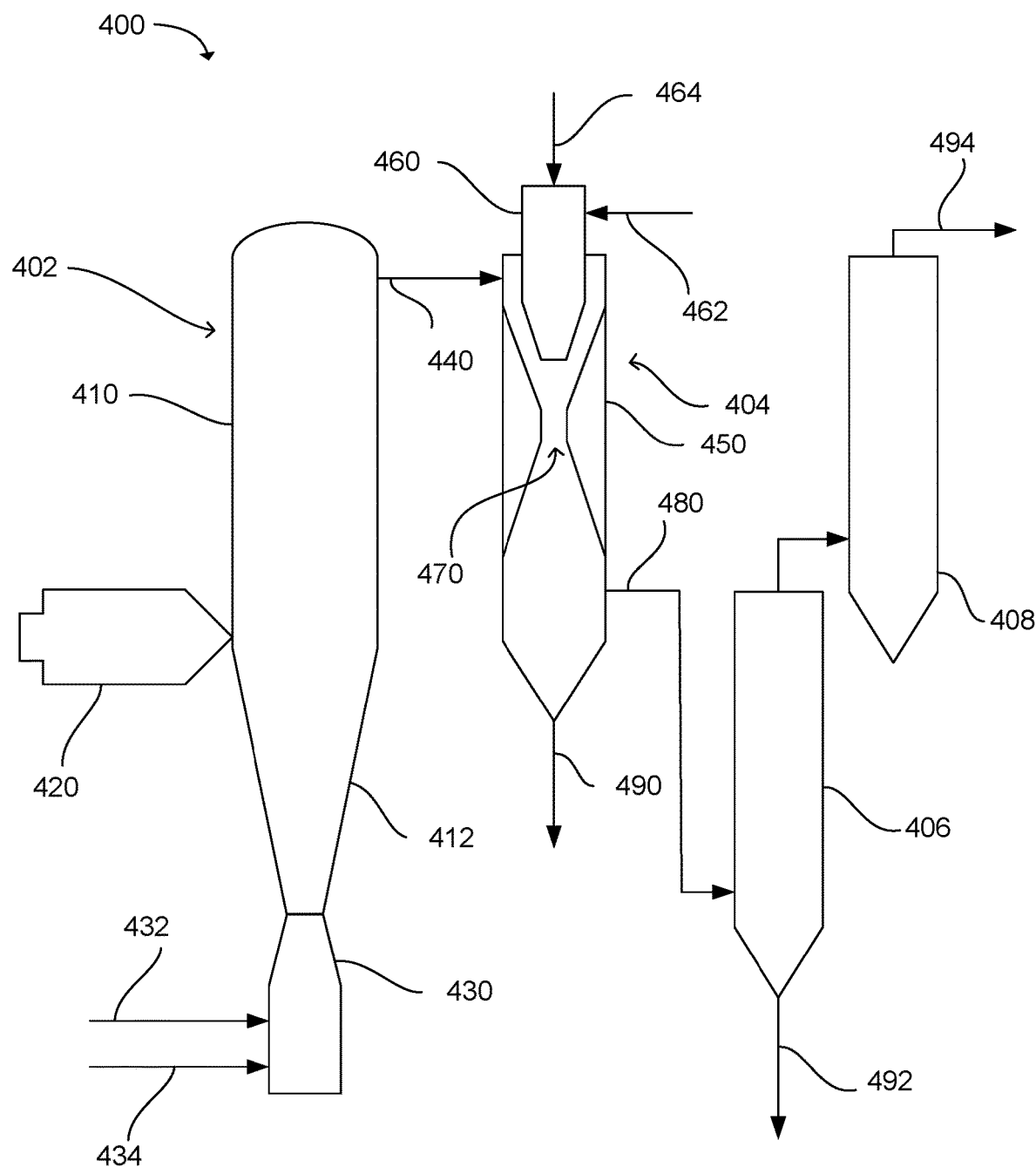
FIG. 4 is a schematic view of yet another example gasification system in accordance with an example of the present technology.

FIG. 4 shows a schematic of a more specific example gasification system 400. The system includes a gasifier 402, a reformer 404, a syngas cleaning column 406, and a water-gas shift column 408. Similar to the gasifier shown in FIG. 1A, the gasifier includes a gasifier body 410, a feeder 420, and a pulse detonation burner 430. A conical portion 412 of the gasifier body expands upward from the bottom of the gasifier body. The pulse detonation burner can be supplied with air or oxygen enriched air through air line 432 and fuel through fuel line 434. The feeder can be positioned to feed an organic material into the gasifier body. Syngas and residual materials, such as organic vapors, tar, carbon-char, and mineral ashes, can flow out of the gasifier through an outlet 440.

The reformer 404 can receive the syngas and residual materials from the outlet 440 of the gasifier 402. The reformer includes a reformer body 450 and a second pulse detonation burner 460 located above the reformer body. The second pulse detonation burner can be connected to the reformer body to direct supersonic shockwaves downward into the reformer body to heat the synthesis gas and residual material. The second pulse detonation burner can also include a second air line 462 and a second fuel line 464 to provide air or oxygen enriched air and fuel to the second pulse detonation burner. The reformer can operate similarly to a venturi ejector. The reformer body can include a venturi constriction 470 to decrease pressure inside the reformer and draw the effluent from the gasifier into the reformer. The heat and mechanical energy provided by the second pulse detonation burner can convert unreacted residuals in the gasifier effluent into additional syngas. The product gases from the reformer, including syngas and remaining residual materials, can flow out of the reformer through reformer outlet 480. In the example shown in FIG. 4, the reformer also has an ash outlet 490 where ash can be removed from the reformer.

The crude syngas produced by the reformer 404 can flow into the syngas cleaning column 406. In the syngas cleaning column, any remaining contaminants entrained in the syngas stream are separated from the syngas product stream. The contaminants can be removed through a contaminant outlet 492 at the bottom of the syngas cleaning column.

Following the reformer, two or more hot-cyclones operated in series may be employed to remove carbon-char and mineral-ash. Due to the pulsing nature of the gas-flow, these cyclones can operate at high centrifugal velocity, and thus high-efficiency, but without the normal high pressure-drop. Hot-cyclones typically need to operate at greater than 100-ft/sec, which requires at least 0.2-psig pressure-drop. The pressure-drop is not significant, but the constriction in the pipe typically required to generate 100-ft/sec can cause problems, e.g. by restricting rapidly changing gas flow that is inherent to gasification. Pulse-detonations that power the Reformer solve this problem by driving the cyclone separators at high-velocity without the need for constrictions in the gas clean-up piping. The syngas product then flows to the water-gas shift column 408. The water-gas shift column can form additional syngas from water vapor and carbon monoxide to produce the final purified syngas product stream 494.

Figure 5:
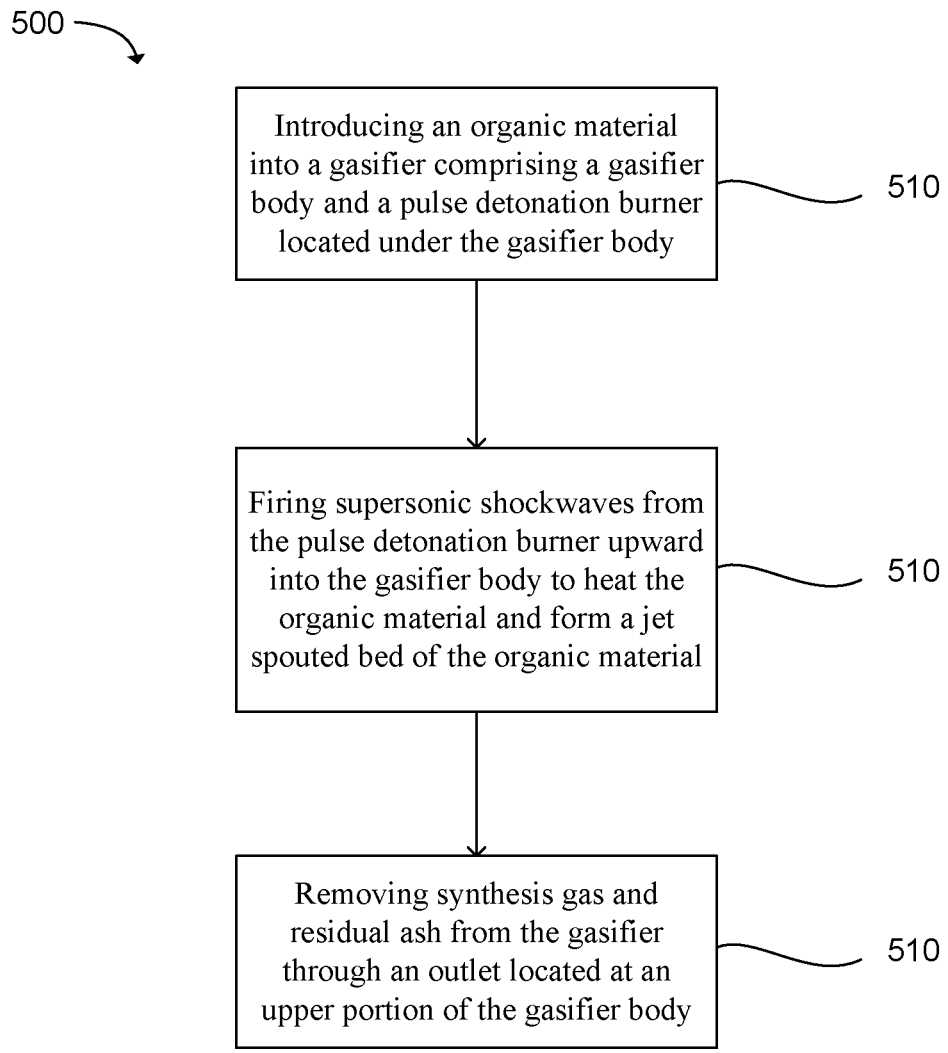
FIG. 5 is a flowchart of an example method of producing synthesis gas in accordance with an example of the present technology.

The present technology also extends to methods of producing synthesis gas. FIG. 5 is a flowchart of one example method 500 of producing synthesis gas. The method includes: introducing an organic material into a gasifier comprising a gasifier body and a pulse detonation burner located under the gasifier body 510; firing supersonic shockwaves from the pulse detonation burner upward into the gasifier body to heat the organic material and form a jet spouted bed of the organic material 520; and removing synthesis gas and residual ash from the gasifier through an outlet located at an upper portion of the gasifier body 530.

In various other examples, methods of producing synthesis gas can include any of the process equipment, operational parameters, processing stages, and other features described above, including an inverse operation firing the first pulse detonation burner downward (e.g. as an entrained flow reactor) in an upside down embodiment with the reforming flowing upwards. The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc., or firing in a horizontal direction. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A pulsed detonation shockwave gasifier comprising:
a gasifier body comprising an inlet;
a feeder positioned to feed an organic material into the gasifier body;
a first pulse detonation burner comprising a discharge zone, wherein the discharge zone is connected to the inlet of the gasifier body, where the first pulse detonation burner is configured to produce a hot gas and discharge the hot gas from the discharge zone into the inlet of the gasifier body, wherein the first pulse detonation burner is located either:

under the gasifier body and connected to the inlet of the gasifier body to direct the hot gas and supersonic shockwaves upward into the gasifier body to heat the organic material and to form a jet spouted bed of the organic material, wherein the hot gas mixes with the organic material to form the jet spouted bed, or above the gasifier body and connected to the inlet of the gasifier body to direct the hot gas and supersonic shockwaves downward into the gasifier body to heat the organic material as an entrained flow reactor; and an outlet connected to the gasifier body;

a reformer connected to the outlet of the gasifier to receive synthesis gas and residual ash from the gasifier, wherein the reformer comprises:

a reformer body, a second pulse detonation burner located either above or below the reformer body and connected to the reformer body to direct supersonic shockwaves downward or upward into the reformer body to heat the synthesis gas and residual ash.

2. The gasifier of claim 1, wherein the hot gas is at a temperature from 750° C. to 3000° C.

3. The gasifier of claim 1, wherein the first pulse detonation burner is located under the gasifier body and the gasifier body comprises a conical portion expanding upward from a lower portion of the gasifier body.

4. The gasifier of claim 1, further comprising a fuel source to supply a hydrocarbon fuel to the first pulse detonation burner and an oxygen-enriched air source to supply oxygen enriched air to the pulse detonation burner.

5. The gasification system of claim 1, wherein at least one of the first pulse detonation burner and the second pulse detonation burner produces shockwaves at a frequency of at least 2 Hz.

6. The gasification system of claim 1, wherein at least one of the first pulse detonation burner and the second pulse detonation burner produces hot gas at a temperature from 750° C. to 1550° C.

7. The gasification system of claim 1, wherein the reformer body comprises a venturi throat connected to the second pulse detonation burner such that hot exhaust gas from the second pulse detonation burner acts as a motive fluid to draw the synthesis gas and residual ash from the gasifier into the reformer.

8. A method of producing synthesis gas, comprising:

introducing an organic material into the pulsed detonation shockwave gasifier of claim 1;

firing hot gas and supersonic shockwaves from the first pulse detonation burner into the gasifier body to heat the organic material using a detonation fuel including a mixture of a hydrocarbon fuel with oxygen-enriched air; and removing synthesis gas and residual ash from the gasifier through an outlet located at an upper portion of the gasifier body.

9. The method of claim 8, wherein the first pulse detonation burner is located under the gasifier body and wherein the firing directs the supersonic shockwaves upward into the gasifier body sufficient to form a jet spouted bed of the organic material.

10. The method of claim 8, wherein the firing directs the supersonic shockwaves downward or sideways into the gasifier body to operate as an entrained flow reactor.

11. The method of claim 8, wherein the supersonic shockwaves are fired at a frequency of at least 2 Hz.

12. The method of claim 8, wherein the supersonic shockwaves travel at a velocity from 100 m/s to 3,000 m/s.

13. The method of claim 8, wherein the hot gas is at a temperature from 750° C. to 3000° C.

14. The method of claim 8, wherein the oxygen-enriched air has 30 mole % to 99.9 mole % oxygen.

15. The method of claim 14, wherein the fuel comprises at least one of carbon-char residues recycled from the gasifier, micronized-carbon sourced from biochar, torrefied biomass, and coal fines, which is optionally entrained by a carrier fluid.

16. The method of claim 8, wherein the supersonic shockwaves comminute the organic material to a smaller particle size than an initial particle size of the organic material.

17. The method of claim 16, wherein the initial particle size of the organic material is from 1 mm to 10 cm.

18. The method of claim 8, wherein the synthesis gas comprises hydrogen and carbon monoxide.

* * * * *